O. W. Baldwin,
Potato Digger.
No. 90,065.  Patented May 18, 1869.
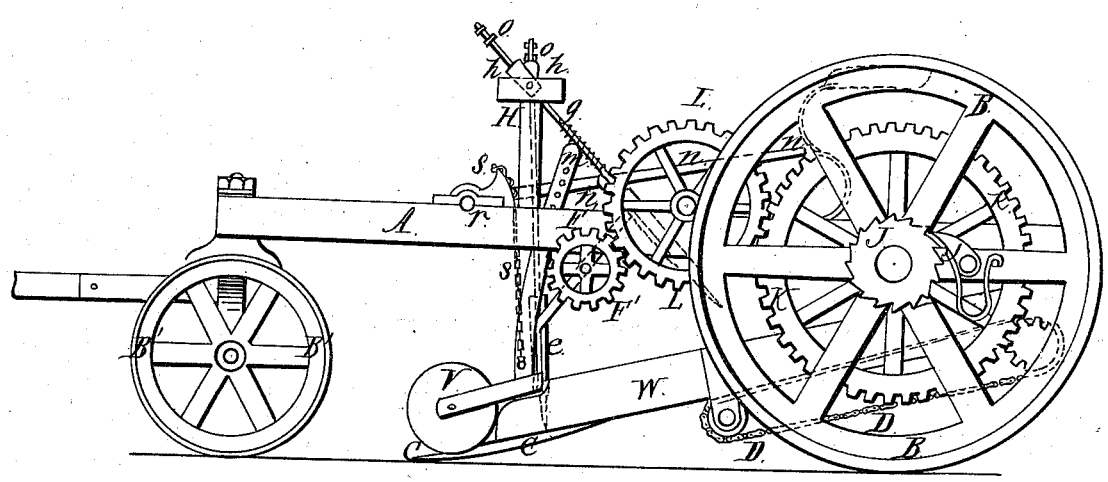
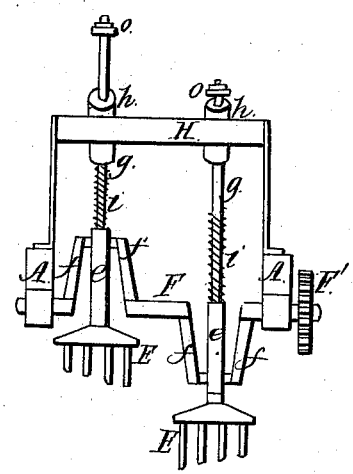
Witnesses:
Jas. L. Coombs
M. O. C. Winn
Inventor:
O. W. Baldwin
by J. J. Coombs
his atty.

United States Patent Office.

OSMER W. BALDWIN, OF GREENFIELD, OHIO, ASSIGNOR TO HIMSELF AND THOMAS F. WRIGHT, OF SAME PLACE.

Letters Patent No. 90,065, dated May 18, 1869.

---

IMPROVEMENT IN POTATO-DIGGER.

---

The Schedule referred to in these Letters Patent and making part of the same.

---

*To all whom it may concern:*

Be it known that I, OSMER W. BALDWIN, of Greenfield, in the county of Highland, and State of Ohio, have invented a new and useful Improvement in Potato-Digging Machines; and I do hereby declare that the following is a full, clear, and exact description thereof, reference being had to the accompanying drawings, and the letters of reference marked thereon.

This invention consists in certain improvements upon a potato-digging machine, for which Letters Patent were issued to the undersigned and Francis H. Pope, bearing date the 9th of April, 1867.

In the accompanying drawings—

Figure 1 is a side elevation of the machine, and

Figure 2 is a front view of the two rakes, the frame which supports them, and the double-crank shaft which operates them.

As these figures show the improvements upon which my claims are based, I do not deem it necessary to present more elaborate drawings, showing, in detail, all those parts of the machine which are constructed substantially in accordance with said former patent of April 9, 1867.

My improvements relate to the raking-mechanism for throwing the contents of the digger back upon the separator, or revolving screen.

A is the frame,

B, one of the two driving-wheels, and

B', one of the two truck-wheels, supporting the front end of the main frame, being pivoted thereto by a king-bolt, which allows said truck-wheels to turn to the right or left, independently of the frame.

C is an iron shovel or digger, with its upper surface concave, and lower surface convex, and its front end rounded or bevelled to an obtuse point.

D is the separator, or screen, consisting of an endless slatted apron, carried by two endless chains, revolving on rollers, substantially as described in said former patent.

The machine is also provided with a "shaker," to agitate the separator, and cause the dirt to fall through, substantially as described in said former patent, but said shaker is not shown in the drawings.

In short, said "digger," "separator," and "shaker" are all constructed and operated substantially as described in said former patent, except that the separator is carried by endless chains instead of belts.

My improved raking-mechanism consists of two rakes, E E, operated by two cranks, $f f$, extending in opposite directions from a revolving shaft, F, so that said rakes will alternately sweep back over the digger and throw the contents thereof upon the revolving apron, or separator.

Each rake has a slotted shaft, $e$, embracing its crank-wrist, which prevents the rakes from revolving in a true circle, and causes them to sweep back over the digger, in close contact therewith.

The digger, from near its front end, clear back to the separator, has a series of open slots, to allow a portion of the earth to fall through, as the rakes sweep the contents back upon the separator, the potatoes, and whatever loose earth may not have fallen through said slots, being carried back and thrown upon the revolving apron, or separator, and the potatoes being finally delivered at the rear end thereof, freed from the loose earth scooped up by the digger.

Each rake has attached to its slotted shaft, and extending in line therewith, a plunger-rod, $g$, and these rods slide through trunnions $h$, supported on a frame, H, and each has coiled round it a spiral spring, $i$, to force the rake down as the crank rises up, and prevent its sticking or becoming tight.

Each plunger-rod is also provided with a screw-nut, $o$, on its upper end, to adjust the drop of the rakes, and prevent them from dragging on the bottom of the digger, and a buffer, $o'$, between said nut $o$ and the trunnions, of vulcanized rubber or some other suitable material, to lessen the noise and jar.

Said adjusting-nut $o$ should also have a set-nut, in connection with it, to prevent it from working loose.

The crank-shaft F is rotated by means of a large cog-wheel, K, on the axle of the driving-wheels, gearing with a smaller cog-wheel, L, which gears with a pinion-wheel, F', on the end of shaft F.

Said large wheel K also operates the separator and shaker, in the same manner as described in said former patent of April 9, 1867.

The driving-wheels are mounted loosely on their axle, so as to turn thereon without operating the machinery when the carriage is backed, but by means of a ratchet-wheel, J, rigidly attached to each end of the axle, and a spring-pawl, $j$, the wheels and axle are caused to revolve together, when the carriage moves forward.

The large cog-wheel K is mounted on a short, loose sleeve upon the axle, but is caused to revolve therewith by means of a clutch, except when the same is thrown out of gear.

This clutch is operated by a lever-handle, in a convenient position to be seized by the driver, so that when it is desired to stop the machinery from operating, while the carriage is moving forward, the driver can easily effect that object by unshipping the clutch.

The front end of the digger is adjustable vertically, by means of adjusting-holes and pins in the segmental shafts $m$, by which it is suspended from the frame A; but as it will be necessary sometimes to raise the digger temporarily, to pass obstructions, and for other purposes, I have provided two sectors $s$, which are mounted on a cross-shaft, $r$, and are connected with the digger by chains $s'$, for that purpose.

By means of the handle $n$, rigidly attached to the shaft $r$, and extending back towards the driver's seat, the driver can instantly raise the front end of the digger when necessary.

The digger, separator, and shaker all turn together upon the same pivot-shaft, at the rear end, as described in the former patent hereinbefore referred to.

For the more effectual agitation of the separator, the endless chains may be made to run over two or more small tappets on the side-boards W; but I do not regard these as essential to the operation of the machine, and therefore have not shown them in the drawings.

Two revolving wheels, of plate-metal, V, with sharp peripheries, are attached to the front end of the digger, one on each side, to cut the vines and grass upon the surface of the ground, and prevent clogging.

These cutting-wheels rotate only by force of their contact with the ground as the machine moves.

Having thus fully described my improvements,

What I claim as my invention, and desire to secure by Letters Patent, is—

1. In combination with the digger and revolving slatted apron, the two rakes, operated by the double-crank shaft, substantially as and for the purpose set forth.

2. In combination with the slotted rakes, worked by a double-crank shaft, and supported by the frame H, as described, the adjusting-nuts $o$, as and for the purpose described.

3. In combination with the slotted rakes, worked by the double-crank shaft, and the supporting-frame H, the spiral springs $i$, on the plunger-rods of the rakes, substantially as and for the purpose described.

4. In combination with the slotted rakes, double-crank shaft, and supporting-frame H, the trunnions or oscillating braces $h$, substantially as described.

O. W. BALDWIN.

Witnesses:
Jos. L. Coombs,
John D. Barclay.